(12) United States Patent
Unnimadhavan et al.

(10) Patent No.: US 9,456,031 B2
(45) Date of Patent: Sep. 27, 2016

(54) NETWORK DEVICE WORKLOAD BALANCING

(71) Applicant: Aruba Networks, Inc., Sunnyvale, CA (US)

(72) Inventors: Sandeep Unnimadhavan, Bangalore (IN); Naveen Manjunath, Bangalore (IN); Pradeep Iyer, Cupertino, CA (US); Santashil Palchaudhuri, West Bengal (IN)

(73) Assignee: Aruba Networks, Inc., Sunnyvale, CA (US)

( * ) Notice: Subject to any disclaimer, the term of this patent is extended or adjusted under 35 U.S.C. 154(b) by 308 days.

(21) Appl. No.: 14/067,865

(22) Filed: Oct. 30, 2013

(65) Prior Publication Data
US 2015/0120864 A1    Apr. 30, 2015

(51) Int. Cl.
*G06F 15/16* (2006.01)
*H04L 29/08* (2006.01)

(52) U.S. Cl.
CPC ................................ *H04L 67/1008* (2013.01)

(58) Field of Classification Search
CPC .................... H04L 67/1008; H04L 47/125
See application file for complete search history.

(56) References Cited

U.S. PATENT DOCUMENTS

| | | | |
|---|---|---|---|
| 2009/0034470 A1* | 2/2009 | Nagarajan et al. | 370/331 |
| 2010/0195497 A1* | 8/2010 | Iyer et al. | 370/235 |
| 2010/0290397 A1* | 11/2010 | Narayana et al. | 370/328 |
| 2011/0004913 A1* | 1/2011 | Nagarajan et al. | 726/1 |
| 2011/0252237 A1* | 10/2011 | PalChaudhuri et al. | 713/168 |
| 2013/0003654 A1* | 1/2013 | Iyer et al. | 370/328 |
| 2013/0103836 A1* | 4/2013 | Baniqued et al. | 709/226 |
| 2014/0059218 A1* | 2/2014 | Ganu et al. | 709/224 |
| 2014/0269648 A1* | 9/2014 | Unnimadhavan et al. | 370/338 |
| 2015/0003284 A1* | 1/2015 | Gupta et al. | 370/254 |

* cited by examiner

*Primary Examiner* — Moustafa M Meky
*Assistant Examiner* — Thorne E Waugh
(74) *Attorney, Agent, or Firm* — Mannava & Kang, P.C.

(57) ABSTRACT

A method and computer readable medium for network device workload balancing, including: selecting a particular network device for storing client information associated with a client device; subsequent to the client device disassociating with a first network device, receiving, by the particular network device from the first network device, the client information; and responsive to the client device associating with a second network device: transmitting, by the particular network device, the client information to the second network device, where the client device does not associate with the particular network device between associating with the first network device and the second network device.

15 Claims, 6 Drawing Sheets

NETWORK DEVICE WORKLOAD BALANCING

BACKGROUND

Computer networks allow users to connect to other users and to various services and sources of content. For example, using a client device, the user may receive information from a remote location. Although all network devices in a computer network usually handle some network traffic (e.g., packets), the workload can vary considerably among the network devices. In other words, some network devices may operate close to maximum capacity, while other network devices may be underutilized. This may have a negative impact on network performance and throughput.

OVERVIEW

In general, one or more embodiments are directed towards a non-transitory computer readable medium (CRM) comprising instructions which, when executed by one or more hardware processors, causes performance of operations. The operations comprise: selecting a particular network device for storing client information associated with a client device; subsequent to the client device disassociating with a first network device, receiving, by the particular network device from the first network device, the client information; and responsive to the client device associating with a second network device: transmitting, by the particular network device, the client information to the second network device, wherein the client device does not associate with the particular network device between associating with the first network device and the second network device.

In general, one or more embodiments are directed towards a system. The system comprises: a device including at least one hardware processor; the system being configured to perform operations comprising: selecting a particular network device for storing client information associated with a client device; subsequent to the client device disassociating with a first network device, receiving, by the particular network device from the first network device, the client information; and responsive to the client device associating with a second network device: transmitting, by the particular network device, the client information to the second network device, wherein the client device does not associate with the particular network device between associating with the first network device and the second network device.

Other aspects of the embodiments will be apparent from the following description and the appended claims.

DETAILED DESCRIPTION

Figure 1A:
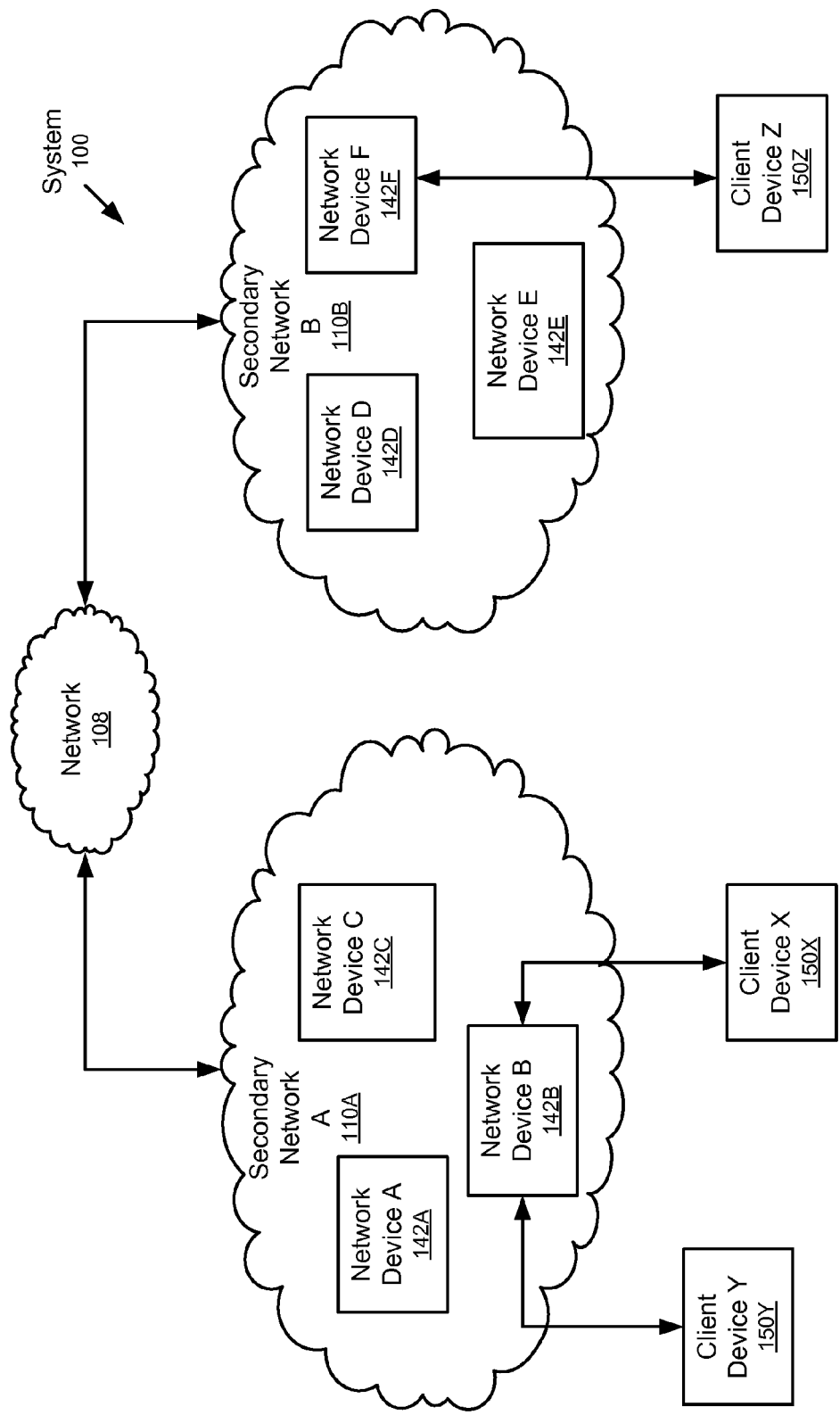
FIG. 1A, FIG. 1B, and FIG. 1C show a system(s) in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

In general, embodiments provide a non-transitory computer readable medium (CRM), a system, and a method for network device workload balancing. In one or more embodiments, when a network device is a home agent for a large number of client devices, the network device stores client information for the large number of client devices and handles large amounts of network traffic associated with the large number of client devices. This may effectively overload the single network device. In order to reduce the possibility of overloading the single network device, another network device having a lighter workload may be selected to be the home agent of one or more of the client devices. Selection of the new home agent and transfer of the session information to the new home agent may occur when the client device roams from one client device to another client device (e.g., in another subnet).

FIG. 1A shows a schematic diagram of a system in accordance with one or more embodiments. As shown in FIG. 1A, the system may include client devices (e.g., client device X (150X), client device Y (150Y), client device Z (150Z)), secondary networks (e.g., secondary network A (110A), secondary network B (110B)), and network devices (e.g., network device A (142A), network device B (142B), network device C (142C), network device A (142D), network device E (142E), network device F (142F)). The client devices (150X, 150Y, 150Z) and the network devices (142A-E) are discussed below.

A client device (e.g., client device X (150X), client device Y (150Y), client device (150Z)) is a computing system in accordance with one or more embodiments. In one or more embodiments, a client device may be a station. For example, the client device may be a mobile device (e.g., laptop computer, smart phone, personal digital assistant, tablet computer, or other mobile device), desktop computer, server, blade in a server chassis, or any other type of computing device or devices that includes at least the minimum processing power, memory, and input and output device(s) to perform one or more embodiments. The client devices may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or microcores of a processor.

In one or more embodiments, a client device (e.g., client device X (150X), client device Y (150Y), client device (150Z)) is a destination of one or more packets. In particular, a client device may execute an application that processes the packets. For example, the packets may be packets of streaming communication (e.g., a video stream, audio stream, or other multimedia stream). By way of another example, packets may be control and management packets like DHCP broadcast packets, Router/Neighbor advertisements. In the example, the client device may include functionality to process the streaming communication and present the streaming to a user viewing an output device on the client device. In one or more embodiments, a client device is a source of one or more packets. In particular, a client device may execute an application(s) that generates the packets.

In one or more embodiments, a client device is connected to the network (108) via a network device. Specifically, at a particular moment in time, a client device may be connected to a single network device. A network device may be connected to any number of client devices. Further, the number of client devices connected to the network device may vary between network devices and over time. The connection between the client device and the network device may be wired or wireless or direct or indirect. For example, in FIG. 1A, network device B (142B) connects client device X (150X) and client device Y (150) to the network (108). Similarly, network device F (142F) connects client device Z (150Z) to the network (108).

A network device (e.g., network device A (142A), network device B (142B), network device C (142C), network device D (142D), network device E (142E), network device F (142F)) is a hardware device that is configured to receive packets (e.g., unicast packets, multicast packets) and transmit the packets to the client devices connected to the network device and roamed client devices of the network device. A network device might also be configured to receive packets from a client device and transmit the packet to the network (108), to other network devices, and/or to other client devices. The network device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor.

By way of an example, a client device may be directly wired or wirelessly communicatively connected to a single access point, which is directly communicatively connected to a single controller, which is connected to the network (e.g., network (108)). In the example, the network device may be the access point, the controller, an access point that includes the functionality of a controller, a switch (e.g., mobility access switch), or other such device. Additionally, by way of an example, one network device may be a controller while another network device may be an access point. The network device that is the access point in the example may or may not be connected to the network via the network device that is a controller.

Access points are digital devices that may be communicatively coupled to one or more networks (e.g., Internet, an intranet, etc.). Access points may be directly connected to the one or more networks or connected via a controller. In other words, an access point may be directly connected to a particular controller. An access point may include a wireless access point (WAP) that communicates wirelessly with devices using Wi-Fi, Bluetooth or related standards and that communicates with a wired network.

In the description, a client device may roam from a first controller to a second controller when the client device roams from an access point that is the first controller or is connected to the first controller to another access point that is the second controller or is connected to the second controller. A client device is connected to and/or roams to an access point, when the client device is associated with the access point.

In one or more embodiments, the client devices (150X, 150Y, 150Z)) and network devices (142A-142E)) are in separate secondary networks (e.g., secondary network A (110A), second network B (110B)) that are connected by network (108). Each of the secondary networks (110A, 110B) may be, for example, local area networks, such as separate Internet Protocol (IP) subnets. In some embodiments, a single network device may exist in a single secondary network. In such embodiments, the network device in a particular separate network may include functionality to manage the particular separate network. In one or more embodiments, the secondary network may include multiple client devices.

In one or more embodiments, for each client device (150X, 150Y, 150Z), there exists a network device that acts as a home agent for the client device. In FIG. 1, network device B (142B) is the home agent or home network device for both client device X (150X) and client device Y (150Y). Similarly, network device F (142F) is the home agent or home network device for client device Z (150Z). In one or more embodiments, the home agent corresponds to the network device that first communicates with a client device when the client device joins the system (100). In one or more embodiments, the home agent corresponds to the last network device in the secondary network that communicated with client device. Accordingly, network devices on the border of a secondary network (e.g., the perimeter/entry of a building where the secondary network is operational) are often designated home agents.

In one or more embodiments, the home agent (i.e., home network device) stores client information associated with the client device. Client information may include, for example, authentication information (e.g., information related to, used in, or generated during prior authentications of the client device), multicast information (e.g., information related to multicasts received by the client device), encryption information (e.g., information related to encryption keys used for encrypting data received by the client device or data sent by the client device), firewall session information (e.g., information related to a firewall session defining acceptable data sources or data types for the client device), gateway information (e.g., dynamic host configuration protocol (DHCP) parameters used for an access point or controller when communicatively coupling the client device to one or more resources on the network), IP address of the client device, or any other session information related to the client device. Moreover, the home agent enforces the firewall rules for the client device and keeps track of all client sessions.

In one or more embodiments, when the client device (150X, 150Y, 150Z) roams from a home network device ("first network device") to a network device in a different secondary network ("second network device"), a mobility tunnel may be established between the first network device and the second network device. A mobility tunnel is a logical structure that identifies to the first network device and the second network device that one or more client devices of the first network device have roamed to the second network device. In other words, a mobility tunnel defines a packet transmission relationship from the first network device to the second network device. The mobility tunnel ensures the roamed client device receive packets that were originally directed to the first network device.

As discussed above, a network device may act a home agent for multiple client devices. Accordingly, if many of the client devices roam to different secondary networks, the home network device may need to maintain and interact with multiple mobility tunnels, effectively overloading the home agent and potentially reducing the overall performance/throughput of the system (100).

In one or more embodiments, when a client disassociates from the first network device and roams to a different secondary network, the client information is transferred to a particular network device other than the first network device. As discussed above, the home agent enforces the firewall rules for the client device and keeps track of all client sessions. This is shared with the particular network device. Accordingly, the particular network device becomes the new home agent for the client device. In one or more embodiment, transfer of the client information is accomplished by initiating an L2 roaming between the first network device and the selected particular network device.

In one or more embodiments, the particular network device is selected based on its current workload. In other words, load balancing is performed to prevent overloading of the first network device. The particular network device may also be selected because the client device associated (e.g., communicated) with the particular network device before associating with the first network device and/or based on a preference set by a user. The particular network device may be in the same secondary network (e.g., same IP subnet) as the first network device or a different secondary network (e.g., different IP subnet) than the first network device. By way of example, in FIG. 1A, network device C (142C) may be selected as the particular network device. Network device A (142A) and network device C (142C) are both in secondary network A (110A).

Figure 1B:
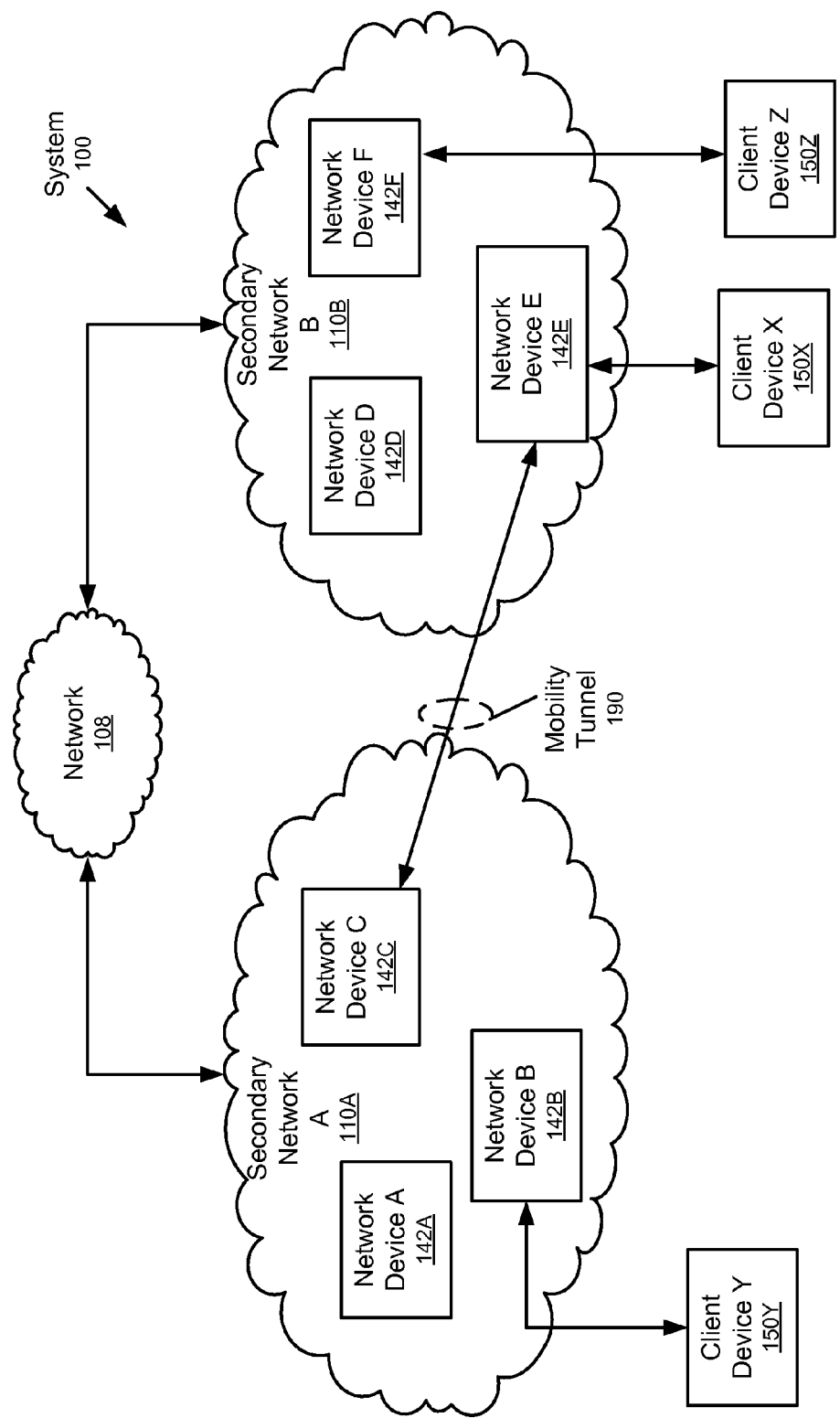

Now turning to FIG. 1B, client device X (150X) has roamed to secondary network B (110B) and associated with network device E (142E). In one or more embodiments, when a new client device connects with a network device for the first time, the network device is configured to determine whether other network devices in the same secondary network have client information for the new client device. For example, the network device may broadcast an L2 roaming query to other network devices in the same secondary network. Then, if it is determined that other network devices in the same secondary network do not have the client information for the new client, the network device is further configured to determine whether other network devices in other secondary networks have the client information. For example, the network device may broadcast an L3 roaming query to the other secondary networks. Following a successful L3 roaming query, a mobility tunnel may be established between the network device and the home network device in the other secondary network. Those skilled in the art, having the benefit of this detailed description, will appreciate that L2/L3 roaming queries include primarily the MAC address of the client device and the service set identifier (SSID) of the wireless interface to which the client device is connected.

By way of example, when client device X (150) associates with network device E (142E), network device E (142E) is configured to broadcast an L2 roaming query regarding client device X (150X) to network device D (142D) and network device F (142F), which are also in secondary network B (110B). If no response is received within a predetermined time window (i.e., there is an L2 roaming query timeout), only then does the network device E (142E) broadcast an L3 roaming query to secondary network A (110A). The L3 roaming query to secondary network A (110A) is successful, and a mobility tunnel (190) is established between network device E (142E) and network device C (142C) (i.e., the particular network device that is the new home agent of client device X (150X)). Those skilled in the art, having the benefit of this detailed description, will appreciate that by broadcasting an L3 roam query to other IP subnets only if the broadcast of an L2 roam query fails, the number of messages exchanged between network devices is reduced.

In one or more embodiments, if the client device X (150X) roams from network device E (142) to a different network device within secondary network B (110B) (e.g., network device D (142D), network device F (142F)), yet another new home agent for client device X (150X) is assigned to balance workloads in secondary network A (110A) (e.g., network device A (142A). A new mobility tunnel (not shown) may be established between network device A (142A) (i.e., the newest home agent for client device X (150X)) and network device D (142D) or network device F (142F).

Figure 1C:
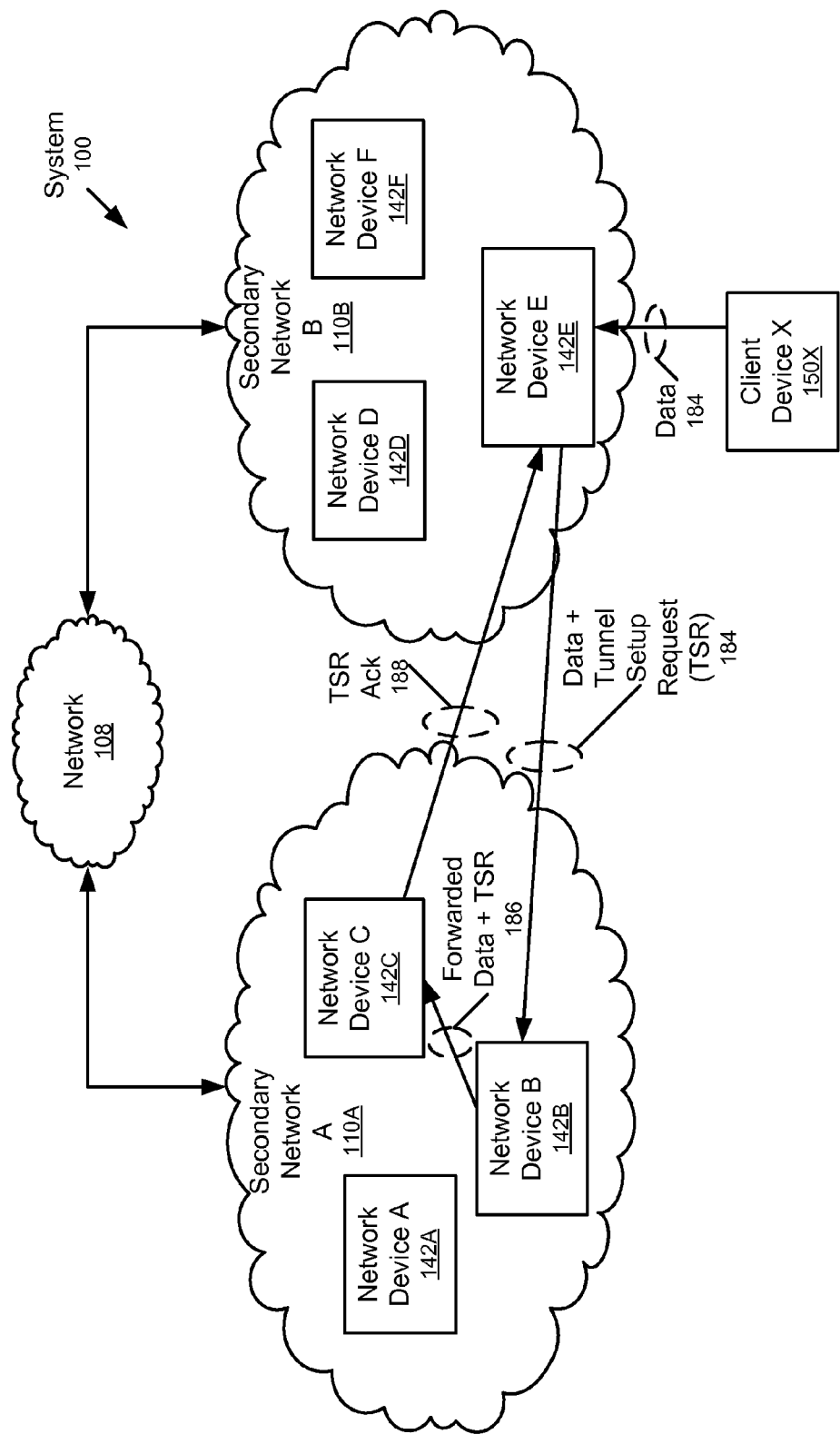

Now turning to FIG. 1C, client device X (150X) has roamed from network device B (142B) in secondary network A (110A) to network device E (142E) in secondary network B (110B). Moreover, network device C (142C) has been selected as the particular network device to act as the home agent for client device X (150X). As discussed above, secondary network A (110A) and secondary network B (110B) may correspond to different IP subsets having different gateway IP addresses. Moreover, it may necessary for a network device to transmit the data packets created by client device to the home secondary network of the client device (i.e., the secondary network having the home agent of the client device) via a mobility tunnel (i.e., L3 mobility allows client devices to roam to a foreign IP subnet and retain connectivity using the same IP addresses). However, if the mobility tunnel is not yet established, the data packets will need to be buffered and/or dropped.

In one or more embodiments, all network devices (142A, 142B, 142C, 142D, 142E, 142F) maintain mappings between each client device and the home secondary network of the client device. The network device may be able to identify the home secondary network (e.g., home IP subnet) of the recently associated client device based on the ARP or first L3 data packet transmitted by the client device to the network device. For example, network device E (142E) is able to identify secondary network A (110A) (i.e., the home secondary network of client device X (150X)) from the first L3 data packet (182) sent by client device X (150).

In one or more embodiments, the network device is configured to send a mobility tunnel setup request (TSR) with the data packets to the home secondary network of the client device. In other words, the data packets are effectively piggy-backed with the TSR. As a result of the assignment and reassignment of home agents, it is possible that the previous home agent will receive the TSR with data packets. For example, in FIG. 1C, the data and TSR (184) is sent to the previous home agent, Network Device B (142B). In such embodiments, the previous home network device relays/forwards the TSR with data packets to the current home agent (i.e., selected particular network device). For example, still referring to FIG. 1C, home network device B (142B) forwards the TSR and data packets (186) to network device C (142C), which is the particular network device previously designated to be the new home agent for client device X (150X). Moreover, in such embodiments, the particular network device transmits an acknowledgement of the TSR to the network device connected to the client device. In other words, there is effectively a triangular acknowledgement. By way of example, in FIG. 1C, network device C (142C) is sending an acknowledgement (188) regarding the TSR to network device E (142E). The data packets may continue to flow in this manner (i.e., network device E (142E) to network device B (142B), then forwarded/relayed to network device C (142C)) until the mobility tunnel between network device C (142C) and network device E (142E) (e.g., mobility tunnel (190) in FIG. 1B) is established. This scheme effectively reduces and/or eliminates the need to drop or buffer (in network device E (142E)) the data packets generated by client device X (150X) while the mobility tunnel is being established.

Figure 2A:
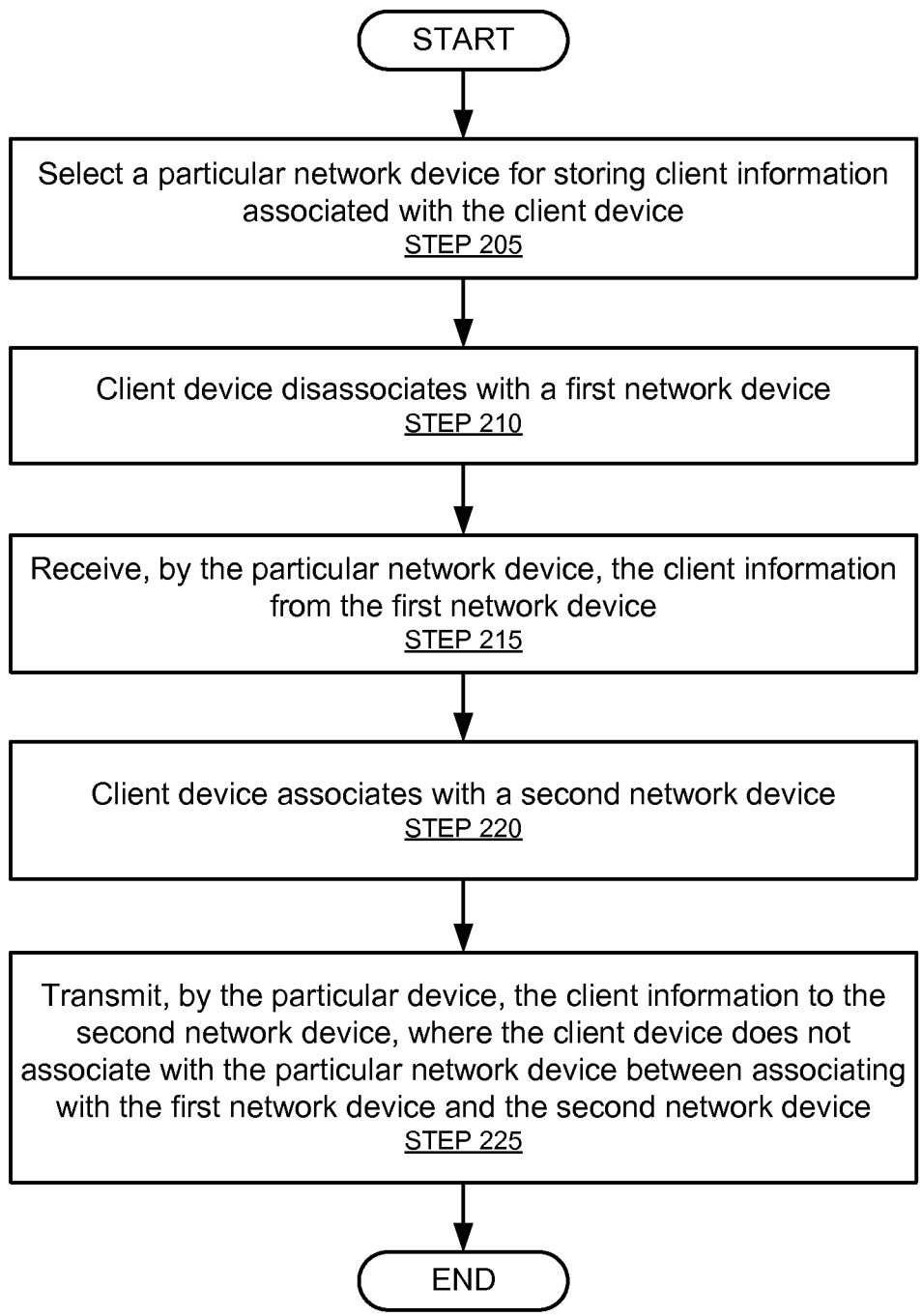
FIG. 2A, FIG. 2B, and FIG. 2C show flowcharts in accordance with one or more embodiments.

FIG. 2A shows a flowchart in accordance with one or more embodiments. The process shown in FIG. 2A may be executed, for example, by one or more client devices and/or network devices, discussed above in reference to FIG. 1A, FIG. 1B, and FIG. 1C. One or more steps shown in FIG. 2A may be omitted, repeated, and/or performed in a different order among different embodiments. Accordingly, embodiments should not be considered limited to the specific number and arrangement of steps shown in FIG. 2A.

Initially, a particular network device is selected for storing client information associated with a client device (STEP 205). In other words, the particular network device is selected to be the new home network device or new home agent of the client device. In one or more embodiments, the existing home network device ("first network device") may be overloaded and thus negatively impacting system performance/throughput. In one or more embodiments, the particular network device may be located in the same secondary network (e.g., IP subnet) as the first network device. Additionally or alternatively, the particular network device may be located in a different IP subnet as the first network device. The particular network device may have been previously connected to the client device prior to the client device connecting to the first network device. The particular network device may be selected based on a user preference.

In an embodiment, an access point, with which the client device has never associated with, is selected as a home agent for the client device. In an example, the access point is selected as the home agent based on a current load at the access point, an average load at the access point over a period of time, a number of client devices for which the access point serves as a home agent, a load across multiple access points including the access point, a security level associated with the access point, a functionality associated with the access point, and/or a performance capability associated with the access point.

In STEP 210, the client device disassociates with the first network device. As discussed above, the client device may be a mobile device such as a tablet computer or a smart phone. The client device may disassociate with the client device when the operator/user of the client device moves the client device away (e.g., out of range) from the first network device such that a direct wired or direct wireless connection can no longer be established. In other words, the client device roams away. For example, the user/operator of the client device may be walking between buildings.

In STEP 215, the first network device transfers the client information associated with the client device to the particular network device. In other words, the particular network device receives the client information from the first network device. In one or more embodiments, transfer of the client information is accomplished by initiating an L2 roaming between the first network device and the selected particular network device. The particular network device is now the new home network device for the client device.

In STEP 220, the client device associates with a second network device. Specifically, the client device may come within range of the second network device, broadcast identifying packets, and establish a connection with the second network device. The client device did not associate with the particular network device between the time the client device disassociated with the first network device and associated with the second network device. The second network device may be located in a different secondary network (e.g., different IP subnet) than the first network device and the particular network device.

In STEP 225, client information and/or other data packets are transmitted from the particular network device to the second network device. The client information and/or data packets may be transmitted via a mobility tunnel established between the particular network device and the second client device.

Figure 2B:
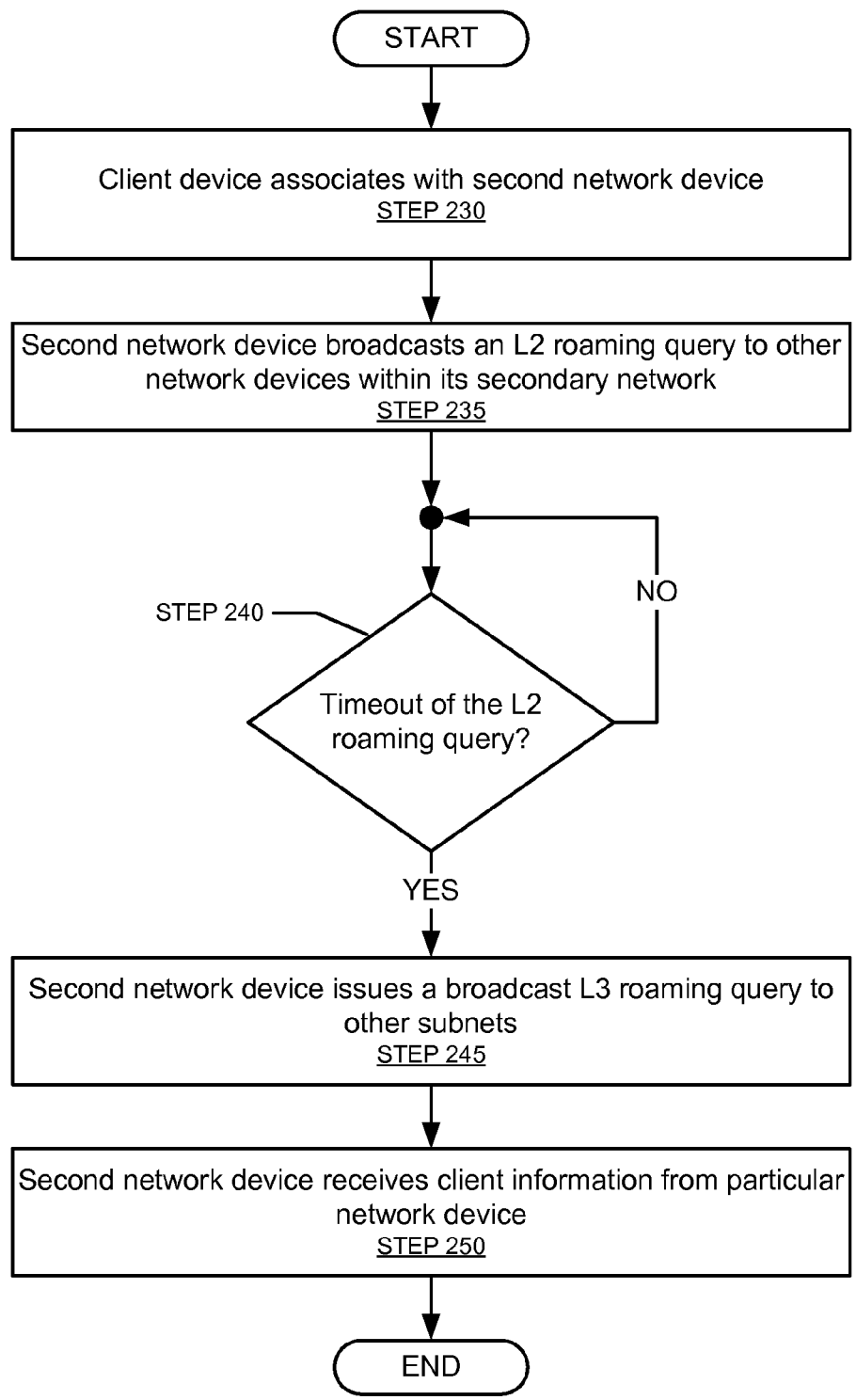

FIG. 2B shows a flowchart in accordance with one or more embodiments. The process shown in FIG. 2B may be executed, for example, by one or more client devices and/or network devices, discussed above in reference to FIG. 1A, FIG. 1B, and FIG. 1C. One or more steps shown in FIG. 2B may be omitted, repeated, and/or performed in a different order among different embodiments. Moreover, one or more steps in FIG. 2B may correspond to or may be executed after STEP 220 in FIG. 2A. Accordingly, embodiments should not be considered limited to the specific number and arrangement of steps shown in FIG. 2B.

In STEP 230, the client device associates with the second network device. Specifically, the client device may come within range of the second network device, broadcast identifying packets, and establish a connection with the second network device. The client device may have just roamed from the first network device.

In STEP 235, when the client device connects with the second network device for the first time, the network device is configured to determine whether other network devices in the same secondary network (e.g., IP subnets) as the secondary device have client information for the client device. Specifically, the network device may broadcast an L2 roaming query to other network devices in the same secondary network.

In STEP 240, the second network device waits for responses from other network devices in its secondary network regarding the identity of the client device. When no response is received within a predetermined time window (i.e., none of the other network devices in the same secondary network as the second network device have the client information of the client device), a timeout has occurred. Then, the process proceeds to STEP 245.

In STEP 245, the L2 roaming query has failed. Only then does the second network device determine whether other network devices in other secondary networks have the client information. Specifically, only then does the second network device broadcast an L3 roaming query to the other secondary networks.

In STEP 250, the L3 roaming query is successful. The particular network device in the other secondary network has been identified. Moreover, a mobility tunnel is established between the particular network device and the second network device. Client information and data packets may now be transmitted across the mobility tunnel.

In an embodiment, the particular network device transmits the client information to the second network device subsequent to a beginning of a process for the client device associating with the second network device. In an example, the second network device may request or query for the client information upon receiving an authentication request from the client device. In another example, the particular network device transmits the client information to the second network device upon receiving information indicating that the client device will connect to the second network device. In another example, the second network device requests the client information subsequent to completion of the process of the client device associating with the second network device.

Figure 2C:
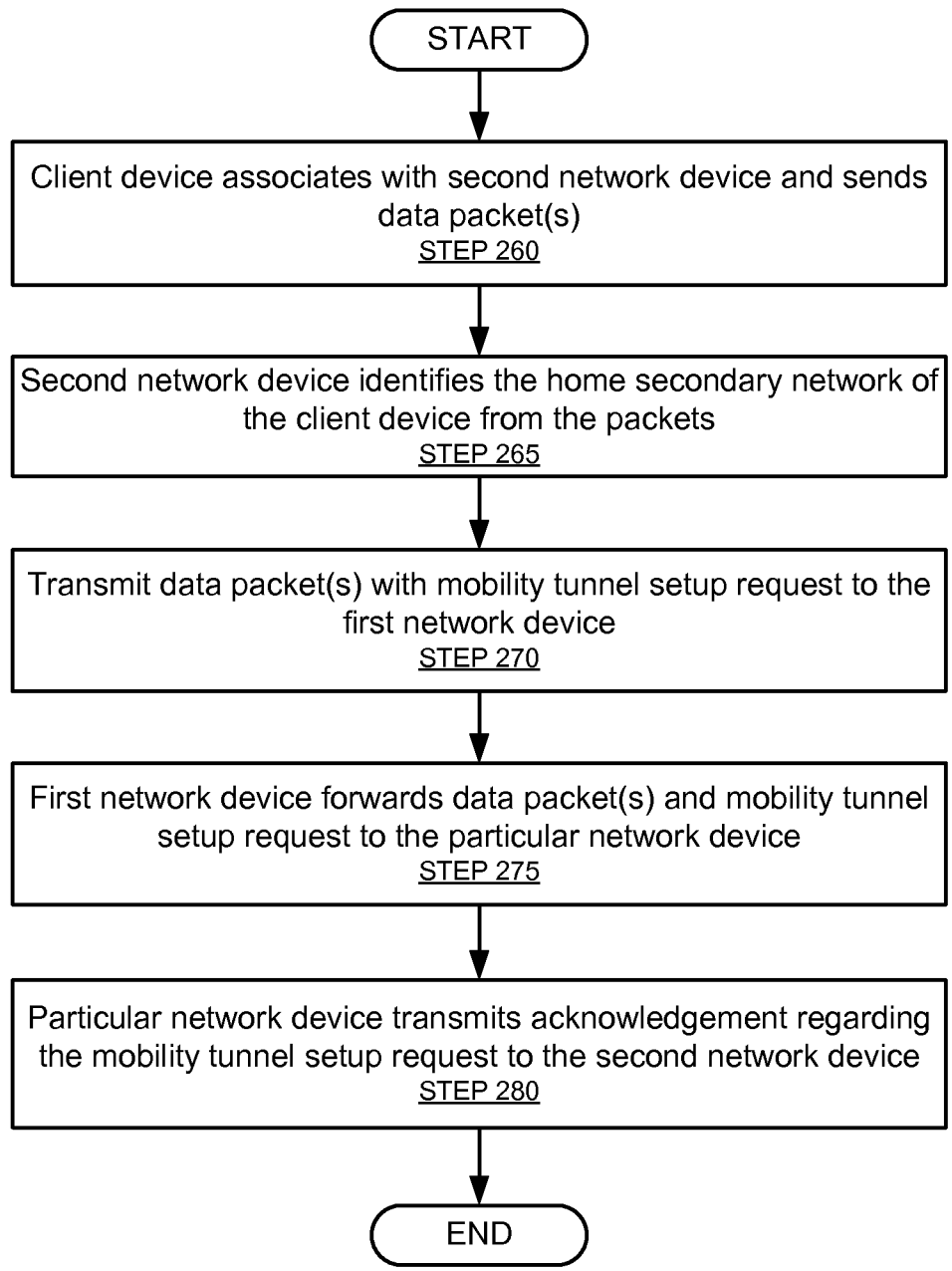

FIG. 2C shows a flowchart in accordance with one or more embodiments. The process shown in FIG. 2C may be executed, for example, by one or more client devices and/or network devices, discussed above in reference to FIG. 1A, FIG. 1B, and FIG. 1C. One or more steps shown in FIG. 2C may be omitted, repeated, and/or performed in a different order among different embodiments. Moreover, one or more steps in FIG. 2C may correspond to or may be executed after STEP 220 in FIG. 2A. Accordingly, embodiments should not be considered limited to the specific number and arrangement of steps shown in FIG. 2C.

Initially, the client device associates with the second network device (STEP 260). Specifically, the client device may come within range of the second network device, broadcast identifying packets, and establish a connection with the second network device. The client device may have just roamed over from the first network device. As discussed above, the client device may generate data packets for other devices. Moreover, it may necessary for a network device to transmit the data packets created by client device to the home secondary network of the client device (i.e., the secondary network having the home agent of the client device) via a mobility tunnel. However, if the mobility tunnel is not yet established, the data packets will need to be buffered and/or dropped.

In STEP 265, the second network device identifies the home secondary network (i.e., home IP subnet) of the client device. As discussed above, all network devices maintain mappings between each client device and the home secondary network of the client device. The network device may be able to identify the home secondary network (e.g., home IP subnet) of the client device based on the ARP or first L3 data packet transmitted by the client device to the network device.

In STEP 270, the second network device transmits a mobility tunnel setup request (TSR) with the data packets to the home secondary network of the client device. In other words, the data packets are effectively piggy-backed with the TSR. As a result of the assignment and reassignment of home agents, it is possible that the data packets are sent to the first network device instead of the particular network device (i.e., sent to the old home agent instead of the new home agent).

In STEP 275, the first network device relays/forwards the TSR with data packets to the particular network device. In STEP 280, the particular network device transmits an acknowledgement of the TSR to the second network device connected to the client device. In other words, there is effectively a triangular acknowledgement. The data packets may continue to flow in this manner (i.e., second network device to first network device, then forwarded/relayed to the particular network device) until the mobility tunnel between particular network device and the second network device is established. This scheme effectively reduces and/or eliminates the need to drop or buffer (by the second network device) the data packets generated by client device.

In an embodiment, tasks related to a client device are distributed across multiple access points. In an example, tasks include (a) wireless access for accessing one or more network resources and (b) firewalling data corresponding to the client device. While a client device is associated with a first access point, a determination is made that a load at the first access point exceeds a particular threshold and/or a determination is that a load at a second access point is below a particular threshold. In response to the determination, the second access point is selected for performing a portion of the tasks related to the client device. In an example, the first access point may continue to provide network access to the client device for accessing one or more network resources. Furthermore, the second access point may be configured for firewalling data corresponding to the client device. Offloading the firewalling of the data from the first access point to the second access point helps balance the load across the access points.

Embodiments may have one or more of the following advantages: the ability to perform workload balancing between multiple network devices in the same IP subnet or different IP subnets; the ability to reduce messages exchanged between network devices by broadcasting an L3 roam query to other IP subnets only if the broadcast of an L2 roam query fails; the ability to reduce dropped/buffered packets by piggybacking data packets onto a mobility TSR; etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium (CRM) comprising instructions which, when executed by one or more hardware processors, causes performance of operations comprising:
   receiving, by a particular network device from a first network device, client information associated with a client device, wherein the client device associates with a first network device and does not associate with the particular network device;
   responsive to the client device associating with a second network device: transmitting, by the particular network device, the client information to the second network device;
   receiving from the first network device: (1) a data packet previously received by the second network device from the client device and (2) a mobility tunnel setup request; and
   transmitting, to the second network device, an acknowledgement regarding the tunnel setup request.

2. The non-transitory CRM of claim 1, wherein the particular network device is selected to store the client information based on load balancing between the first network device and the particular network device.

3. The non-transitory CRM of claim 1, wherein the particular network device is in a same IP subnet as the first network device.

4. The non-transitory CRM of claim 1, wherein the particular network device is in a different IP subnet than the first network device.

5. The non-transitory CRM of claim 1, wherein the particular network device is selected based on the client device associating with the particular network device prior to the client device associating with the first client device.

6. The non-transitory CRM of claim 1, wherein the particular network device is selected based on user input selecting the particular network device for storing the client information.

7. The non-transitory CRM of claim 1, wherein the particular network device is further selected for receiving data to be forwarded to any network device with which the client device is currently associated.

8. The non-transitory CRM of claim 1, wherein the instructions cause performance of further operations comprising:
transmitting the client information to the second network device in response to an L3 roaming query broadcasted by the second network device to a subnet comprising the first network device and the particular network device.

9. The non-transitory CRM of claim 1, wherein the client information comprises at least one selected from a group consisting of authentication information, multicast information, encryption key information.

10. The non-transitory CRM of claim 1, wherein each of the first network device, the particular network device and the second network device is an access point.

11. The non-transitory CRM of claim 1, wherein the first network device is an access point, wherein the particular network device is a controller other than a controller controlling the first network device.

12. The non-transitory CRM of claim 1, wherein selecting the particular network device comprises selecting the particular network device as a home agent for the client device.

13. A method comprising:
receiving, by a particular network device from a first network device, client information associated with a client device, wherein the client device associates with a first network device and does not associate with the particular network device;
responsive to the client device associating with a second network device, transmitting, by the particular network device, the client information to the second network device;
receiving from the first network device: (1) a data packet previously received by the second network device from the client device and (2) a mobility tunnel setup request; and
transmitting, to the second network device, an acknowledgement regarding the tunnel setup request.

14. The method of claim 13, wherein selecting the particular network device to store the client information is based on load balancing between the first network device and the particular network device.

15. The method of claim 13, further comprising:
transmitting the client information to the second network device in response to an L3 roaming query broadcasted by the second network device to a subnet comprising the first network device and the particular network device.

* * * * *